United States Patent [19]

Olsen et al.

[11] 4,170,472
[45] Oct. 9, 1979

[54] SOLDER SYSTEM

[75] Inventors: Dennis R. Olsen; Keith G. Spanjer, both of Scottsdale, Ariz.

[73] Assignee: Motorola, Inc., Schaumburg, Ill.

[21] Appl. No.: 788,954

[22] Filed: Apr. 19, 1977

[51] Int. Cl.² ............................................. C22C 13/00
[52] U.S. Cl. .................................. 75/175 A; 148/32; 228/263
[58] Field of Search ..................... 75/175 A, 175 R; 148/32, 32.5; 228/263

[56] References Cited

U.S. PATENT DOCUMENTS 2,210,593 8/1940 McCullough ..................... 75/175 A Primary Examiner—R. Dean
Attorney, Agent, or Firm—John A. Fisher

[57] ABSTRACT

A solder system for metallurgically bonding a semiconductor die to a metal package member. The solder is based on the tin rich corner of the tin-antimony-silver ternary alloy system. The solder system has particular applicability to the bonding of power transistors.

4 Claims, 3 Drawing Figures

ULTIMATE TENSILE STRENGTH vs. ALLOY COMPOSITION

SOLDER SYSTEM

BACKGROUND

This invention relates to semiconductor devices and to a method for attaching semiconductor devices to an associated package. More particularly, the invention relates to a metallization system having improved mechanical and thermal properties whereby the semiconductor device may be metallurgically bonded to a metal package member. The invention may be most advantageously applied to power transistors, but is equally applicable to other devices.

A transistor or other semiconductor device, in die form, is metallurgically bonded to a metal member in a metal or metal and plastic package. The package then functions as a mechanical support for the device, provides electrical contact to one terminal of the device, and serves to dissipate heat generated within the device. Accordingly, the bonding material must be low in both terminal and electrical resistance. The material must also be able to survive repeated stressing and maintain its integrity. This is occasioned by the fact that as the device is repeatedly turned on and off the die temperature as well as the package temperature rises and falls. Because the die and the package can have different coefficients of thermal expansion, they will expand at different rates and in different proportions as the operating temperature changes. The composite structure consisting of die, die bond, and package will, thus, be stressed as the temperature changes.

Two different techniques are in common use for metallurgical die bonding. These can be roughly classified as hard solder bonding based on gold alloys and soft solder bonding based on lead or tin alloys. The hard solders form strong bonds having excellent thermal and electrical properties, but the high strength of the hard solder can cause the semiconductor die to fracture or the die and metal member to deform elastically. Hence, for dice larger than approximately 140 mils on a side the die will fracture during temperature cycling because the hard solder transfers the stress to the die without plastic deformation in the die bond. Lead based soft solders are plastic enough to accommodate the thermal expansion mismatch between the die and the package, but soft solder bonds are susceptible to metal fatigue after repeated temperature cycles. Device reliability can thus be degraded. Thicker layers of solder can reduce the stress in the solder and lessen the fatigue problem, but only at the expense of undesirably higher thermal resistance.

SUMMARY

In view of the above-related deficiencies of the prior art solder systems, the objects of this invention are to provide an effective solder composition and method for the metallurgical bonding of a semiconductor device to a metal package member. The attainment of the foregoing and related objects and advantages may be achieved through the use of the novel ternary alloys of the tin-silver-antimony solder system herein disclosed. Specifically, alloys comprising 61 to 69 weight percent tin, 8 to 11 weight percent antimony and 23 to 28 weight percent silver are disclosed. Such alloys have good thermal and electrical properties, have long power cycle lifetimes, are compatible with a number of plating systems, are inexpensive, and have melting points in the desirable range between 200° C. and 300° C.

The components of the invention and the benefits to be derived therefrom should be more readily apparent after review of the following detailed description of the invention taken in connection with the drawings.

THE FIGURES

DETAILED DESCRIPTION

A solder system has been developed which realizes the major advantages of both the hard and soft solder systems and eliminates the disadvantages associated with each separately. This unique solder system is based on alloys in the tin rich corner of the tin-silver-antimony ternary alloy system.

For illustrative purposes, the following table lists the compositional and mechanical properties of twelve such alloys. In the following discussion, the various alloys will be identified by their letter designations in this table.

COMPOSITION AND PROPERTIES OF TIN-SILVER-ANTIMONY ALLOYS

| Alloy | Weight percent of elements | | | $T_{mp}$ (°C.) | Ultimate tensile Strength MPa | Percent reduction in area |
|---|---|---|---|---|---|---|
| | Ag | Sb | Sn | | | |
| A | 3.5 | — | 96.5 | 219.0 | 32.0 | 60.3 |
| B | 3.5 | 1.5 | 95.0 | 221.5 | 37.2 | 82.0 |
| C | 3.5 | 5.0 | 91.5 | 226.5 | 52.7 | 56.3 |
| D | 10.0 | 1.5 | 88.5 | 222.0 | 43.4 | 36.9 |
| E | 20.0 | 1.5 | 78.5 | 223.0 | 56.1 | 23.6 |
| F | 10.0 | 5.0 | 85.0 | 227.0 | 59.8 | 10.2 |
| G | 20.0 | 5.0 | 75.0 | 230.0 | 78.1 | 9.0 |
| H | 3.5 | 10.0 | 86.5 | 229.5 | 65.6 | 18.9 |
| I | 10.0 | 10.0 | 80.0 | 226.0 | 76.7 | 14.6 |
| J | 25.0 | 10.0 | 65.0 | 236.0 | 97.3 | 0.3 |
| K | 25.0 | 15.0 | 60.0 | 235.5 | 94.9 | 0.2 |
| L | 20.0 | 10.0 | 70.0 | 234.0 | 91.1 | 3.0 |

The mechanical properties were measured on an Instron Universal Testing Machine in accordance with standard ASTM testing procedures. The percent reduction in area is a measure of the ductility of the alloy. Alloys having ultimate tensile strengths greater than about 90 MPa exhibited little ductility. Such a low ductility is characteristic of the fatigue-free hard solders.

Figure 1:
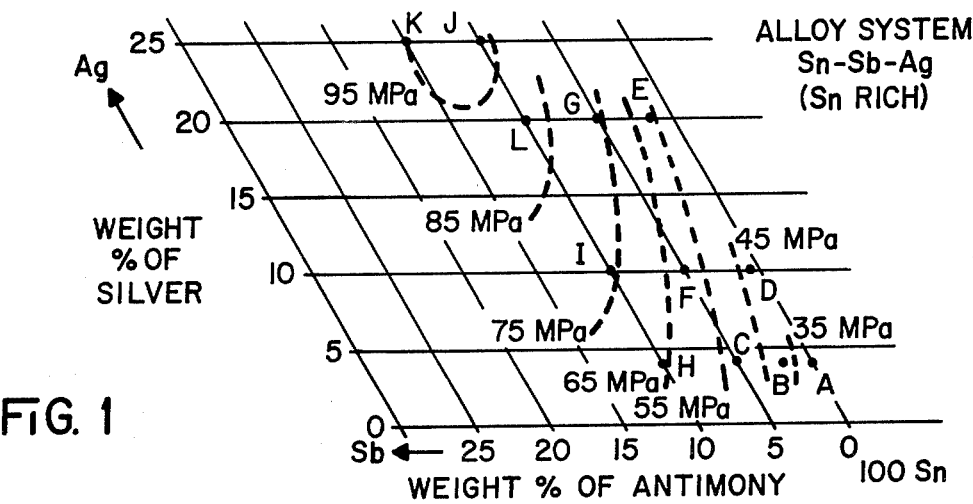
FIG. 1 is a graph showing ultimate tensile strength as a function of tin-antimony-silver ternary alloy composition.

In FIG. 1 the ultimate tensile strength is shown as a function of the ternary solder alloy compositions. The letters in FIG. 1 correspond to the alloy compositions listed in the above table. The dashed lines are interpolated isostress lines. A consideration of FIG. 1 and the above table shows that alloy J, consisting of 65 weight percent tin, 25 weight percent silver and 10 weight percent antimony has the highest ultimate tensile strength of the solders in this system. Repeated testings of several heats of this alloy gave an average ultimate tensile strength of 91 MPa.

The microstructure of these alloys can be described as a mixture of silver-tin and antimony-tin intermetallics in a tin rich matrix. The tin rich matrix is greatly strengthened by antimony and, to a lesser degree, by silver. To obtain the strength and ductility necessary for fatigue-free power cycling, a critical antimony concentration of between 8 and 11 weight percent is required. At 15 weight percent antimony (Alloy K) the solder does not wet well and reliability is degraded. Silver variations in the composition have a smaller effect on the alloy properties but the silver is still necessary. The recommended compositional range is 23 to 28 weight percent silver.

Figure 2:
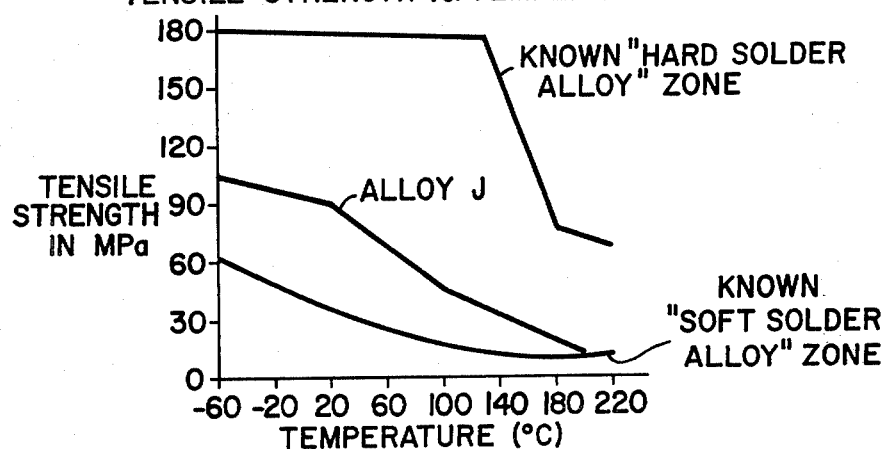
FIG. 2 is a graph showing ultimate tensile strength as a function of temperature for an alloy of 65 weight percent tin, 10 weight percent antimony and 25 weight percent silver.

The ultimate tensile strength of Alloy J as a function of temperature is shown in FIG. 2. For comparison, the tensile strengths of known hard and soft solders are also shown. Alloy J is intermediate in ultimate tensile strength between the known hard and soft solders.

The solder assembly technique involves separately coating both the back of the semiconductor die and the metal package member with suitable metals or alloys. The die is then metallurgically bonded to the metal package member by placing a solder preform between the die and the package and heating to a sufficient temperature to cause the preform to melt and wet the coating metals.

In using the solder systems of the present invention the back of the die can be coated sequentially with a layer of chromium followed by a layer of silver. These can be, for example, 1μm and 3μm in thickness, respectively. Alternatively, the back of the die can be coated sequentially with a layer of about 1.0 to 1.5μm of nickel followed by about 3μm of tin. The metal package member can be plated, for example, with about 3μm thickness of either nickel or silver. The solder preform can be about 100μm in thickness. The metallurigal bond is made by heating the die, solder preform, and package member to a temperature of about 380° C. for a period of three to five seconds. The coating metals are selected from silver and nickel because these metals are compatible with, and easily wet by, the alloy J.

Power transistors were solder assembled in Case-199 plastic encapsulated transistor packages for thermal cycle testing. The tests performed were a measure of safe operating area (SOA), and the change in SOA as a function of the number of power cycles. In one such SOA test, a transistor, biased at a specified percentage of its rated voltage, is forced to a given current for a specified length of time. The specified limits depend on the particular type of transistor being tested. After temperature or power cycling the device, the test is repeated and the current to which the transistor can be forced without being destroyed is noted as a percentage of the original current. The temperature cycle is accomplished by applying power to the transistor so that its heat dissipation causes the device temperature to rise by 100° C.

Figure 3:
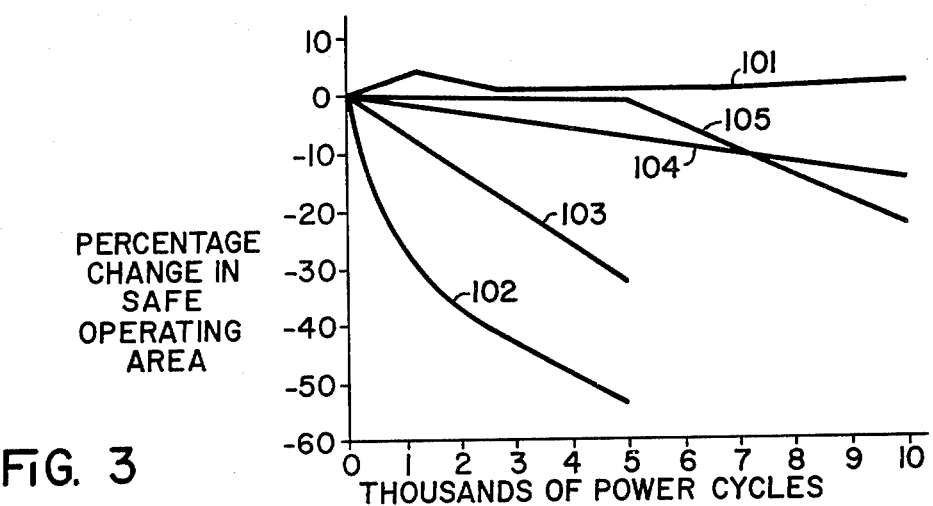
FIG. 3 is a graph comparing changes in safe operating area as a function of number of power cycles for different solder alloys.

FIG. 3 shows the results of these tests. The percentage change in safe operating area is plotted as a function of the number of power cycles for different die bond conditions. Line 101 shows the results for a typical hard solder alloy composed of 80 weight percent gold and 20 weight percent tin. Lines 102 and 103 define the scattered range of performance of samples bonded with three different soft solder alloys. The three alloys tested were 92.5 weight percent lead, 5 weight percent indium and 2.5 weight percent silver; 95 weight percent lead and 5 weight percent tin; and 95 weight percent tin, 3.5 weight percent silver, and 1.5 weight percent antimony (Alloy B). Lines 104 and 105 each indicate the performance of transistors bonded with Alloy J of the present invention. In each case, the metallization on the back of the transistor die was sequential layers of chromium and silver. Line 104 represents the performance of transistors bonded to silver plated metal package members. Line 105 represents the performance of silver transistors bonded to nickel plated metal package members.

Each of the lines 104 and 105 corresponding to Alloy J compare favorably with the results for the hard solder bonds represented by line 101. The results for Alloy J are far superior to the range of results falling between lines 102 and 103 realized by various soft solder alloys.

Thus, it is apparent that there has been provided a solder composition and method that fully satisfies the objects as set forth above. While the invention has been described in terms of specific embodiments thereof, it will be understood that those skilled in the art that changes in details may be made without departing from the spirit and scope of the invention.

What is claimed is:

1. A solder composition for metallurgically bonding a metal backed semiconductor die to a metal package member, said solder composition compatible with and capable of wetting the metal backing of said metal backed semiconductor die, said composition comprising 61 to 69 weight percent tin, 8 to 11 weight percent antimony and 23 to 28 weight percent silver.

2. The solder composition of claim 1 consisting of 65 weight percent tin, 10 weight percent antimony and 25 weight percent silver.

3. In a process for metallurgically bonding a metal backed semiconductor die to a metal package member by placing solder between said die and said member and heating to cause said solder to melt and wet said die and said member, the improvement of using a solder comprising 61 to 69 weight percent tin, 8 to 11 weight percent antimony and 23 to 28 weight percent silver.

4. The process of claim 3 wherein said solder consists of 65 weight percent tin, 10 weight percent antimony and 25 weight percent silver.

* * * * *